US007818313B1

(12) United States Patent
Tsimelzon et al.

(10) Patent No.: US 7,818,313 B1
(45) Date of Patent: Oct. 19, 2010

(54) METHOD FOR DISTRIBUTING PROCESSING OF QUERIES OVER A CLUSTER OF SERVERS IN A CONTINUOUS PROCESSING SYSTEM

(75) Inventors: Mark Tsimelzon, Sunnyvale, CA (US); Aleksey Sanin, Sunnyvale, CA (US); Robert B. Hagmann, Palo Alto, CA (US)

(73) Assignee: Sybase, Inc., Dublin, CA (US)

( * ) Notice: Subject to any disclaimer, the term of this patent is extended or adjusted under 35 U.S.C. 154(b) by 297 days.

(21) Appl. No.: 11/486,902

(22) Filed: Jul. 14, 2006

Related U.S. Application Data

(60) Provisional application No. 60/700,139, filed on Jul. 18, 2005.

(51) Int. Cl.
*G06F 7/00* (2006.01)
*G06F 17/30* (2006.01)
(52) U.S. Cl. ........................... 707/718; 707/966
(58) Field of Classification Search .................. None
See application file for complete search history.

(56) References Cited

U.S. PATENT DOCUMENTS

| | | | | |
|---|---|---|---|---|
| 4,412,285 | A * | 10/1983 | Neches et al. | 709/252 |
| 6,092,062 | A * | 7/2000 | Lohman et al. | 707/2 |
| 6,470,331 | B1 * | 10/2002 | Chen et al. | 707/2 |
| 6,985,904 | B1 * | 1/2006 | Kaluskar et al. | 707/101 |

OTHER PUBLICATIONS

Load Balancing, http://en.wikipedia.org/wiki/Load_balancing_(computer), HTML, Accessed on May 30, 2008.*
Jim Melton, (ISO-ANSI Working Draft) Foundation (SQL/Foundation), Aug. 2003, International Organization for Standardization/American National Standards Institute, pp. 60-63.*
Chen et al, NiagaraCQ: a scalable continuous query system for Internet databases, Jun. 2002, ACM, ACM SIGMOD Record vol. 29 Issue 2, 379-390.*
Deutsch et al, XML-QL: A Query Language for XML, Aug. 1998, W3C, Available: http://www.w3.org/TR/NOTE-xml-ql/ (Accessed: Apr. 14, 2009).*
Babcock et al, Models and issues in data stream systems, 2002, ACM, Proceedings of the twenty-first ACM SIGMOD-SIGACT-SIGART symposium on Principles of database systems, 1-16.*
"Coral8 Complex Event Processing Technology Overview," 2007, pp. 1-2, www.coral8.com.
"Aleri, Coral8 Technology Overview", copyright 2004-2009, pp. 1-2, www.coral8.com.

* cited by examiner

*Primary Examiner*—Pierre M Vital
*Assistant Examiner*—Jason Liao
(74) *Attorney, Agent, or Firm*—Sterne, Kessler, Goldstein & Fox PLLC

(57) ABSTRACT

A method, in a continuous computation system, for processing a set of registered queries over a cluster of servers includes creating an execution plan for processing a set of queries over a cluster of servers, where the continuous computation system creates the execution plan by analyzing the semantics and requirements of the queries to determine how to distribute processing across the cluster. Analysis of a query can include determining whether input messages for the query can be processed independent of each other, whether input messages for the query can be partitioned into groups that can be processed independent of each other, whether the query includes an aggregator function, and whether the query includes a subquery.

42 Claims, 7 Drawing Sheets

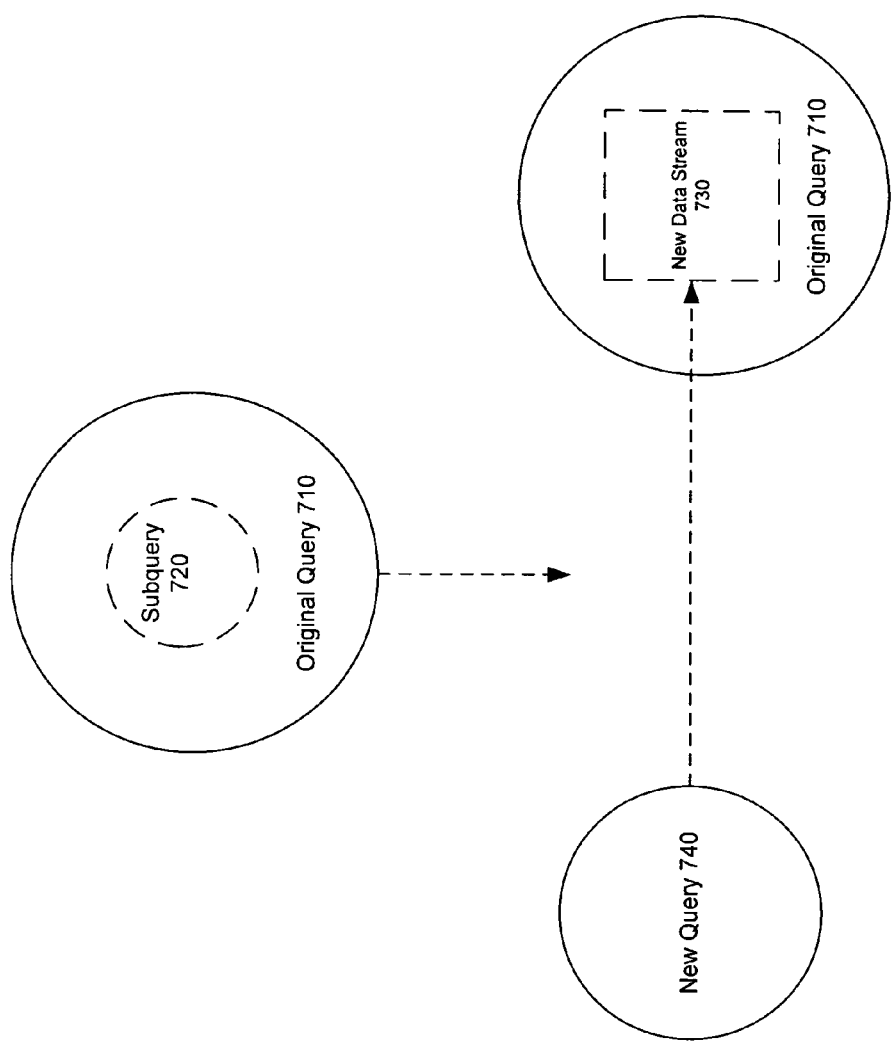

METHOD FOR DISTRIBUTING PROCESSING OF QUERIES OVER A CLUSTER OF SERVERS IN A CONTINUOUS PROCESSING SYSTEM

RELATED APPLICATIONS

This application claims the benefit of U.S. Provisional Application No. 60/700,139 filed on Jul. 18, 2005 with first-named inventor Mark Tsimelzon, and titled "Clustering Options for a Continuous-Processing System," the contents of which are incorporated by reference as if fully disclosed herein.

BACKGROUND OF THE INVENTION

1. Field of the Invention

This invention relates generally to continuous processing systems that process streaming data, and, more specifically, to distributing query processing in such systems over a cluster of servers.

2. Description of the Background Art

A continuous processing system processes streaming data. It includes queries which operate continuously on input data streams and which publish output data streams. As processing the queries can be quite complex, it is desirable to distribute processing over a cluster of servers. While clustering for performance is known for processing static data (i.e., not streaming data), different methods are required to process streaming data. Consequently, there is a need for specific methods for distributing processing of queries that operate continuously on streaming data.

SUMMARY

The present invention provides a method for processing a set of registered queries over a cluster of servers in a continuous computation system. Prior to processing the queries, the continuous computation system creates an execution plan for processing the queries over a cluster of servers. In creating the execution plan, the continuous computation system analyzes the semantics and requirements of the queries to determine how to distribute processing across the cluster. In one embodiment, if a system administrator or developer has inputted instructions or manual "hints" as to how to distribute processing, the system will also factor in such instructions/hints.

The semantics and requirements of each query may be analyzed to determine whether input messages for the query can be processed independent of each other, whether input messages for the query can be partitioned into groups that can be processed independent of each other, whether the query includes an aggregator function, and/or whether the query includes a subquery.

If input messages for a query can be processed independent of each other, then logic for processing the query can be duplicated on two or more servers and the input messages can be divided up in a number of ways, such as a round-robin fashion, randomly, to balance the load, etc. If input messages for a query can be partitioned into groups that can be processed independent of each other (where messages within a group need to be processed on the same server), then logic for processing the query can be duplicated on two or more servers, and input messages can be distributed to the servers in accordance with the group in which the messages belong.

If the query includes an aggregator function, then logic for processing the query can be duplicated on two or more servers and input messages can be distributed in any manner to such servers. Partial outputs for the aggregator are generated on each server and combined to create the final output.

If a query includes a subquery, the subquery can be processed on a different server then the query by replacing the subquery in the original query with a new input data stream and creating a new query based on the subquery which published to such new data stream.

BRIEF DESCRIPTION OF THE DRAWINGS

FIG. 7 is a block diagram that illustrated how a query with a subquery can be broken up into two queries that can be processed on different servers.

DETAILED DESCRIPTION OF THE PREFERRED EMBODIMENTS

Figure 1:
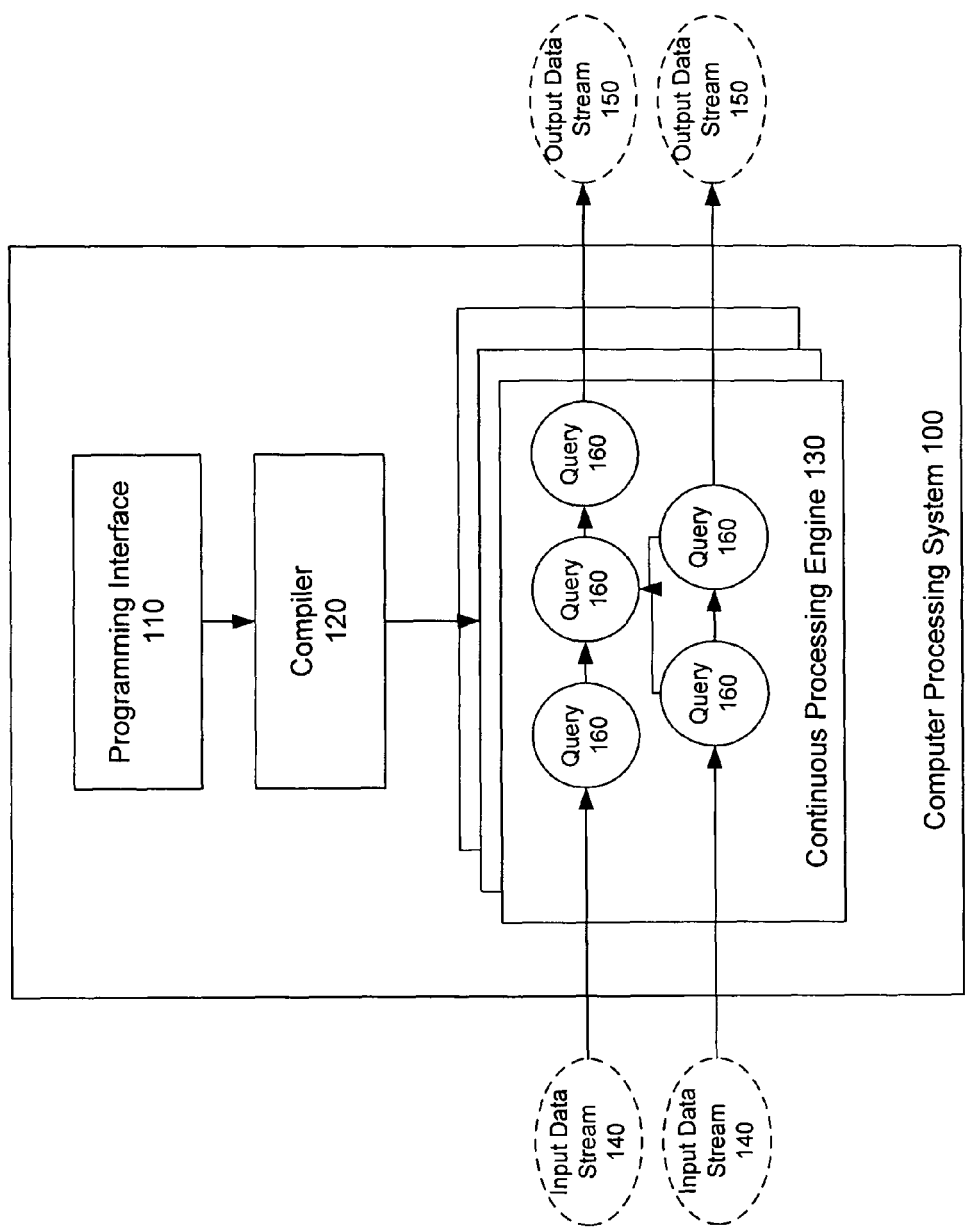
FIG. 1 is a block diagram of a continuous processing system.

FIG. 1 illustrates an example of a continuous processing system that processes streaming data. The system 100 includes a programming interface 110, a compiler 120, and a continuous processing engine 130, where the engine may be distributed over a cluster of servers. The programming interface 110 enables programmers to write queries, which are then complied by the compiler 120 and provided to the continuous processing engine 130. The queries 160 subscribe to input data steams 140 and publish to output data streams 150. Through the engine 130, the queries 160 operate on input data stream continuously.

Coral8, Inc.'s "In-Motion Processing System" is an example of a continuous processing system. Also, one embodiment of a continuous processing system is described in U.S. patent application Ser. No. 11/015,963, filed on Dec. 17, 2004 with Mark Tsimelzon as the first-named inventor, and titled "Publish and Subscribe Capable Continuous Query Processor for Real-time data streams," the contents of which are incorporated by reference as if fully disclosed herein.

Queries may be written in a continuous-processing software language (CPL), which is sometimes also referred to as a continuous correlation language (CCL). An example of such a language described in the U.S. patent application Ser. No. 11/346,119, filed on Feb. 2, 2006, and titled "Continuous Processing Language for Real-time Data Streams," the contents of which are incorporated by reference as if fully disclosed herein.

Figure 2:
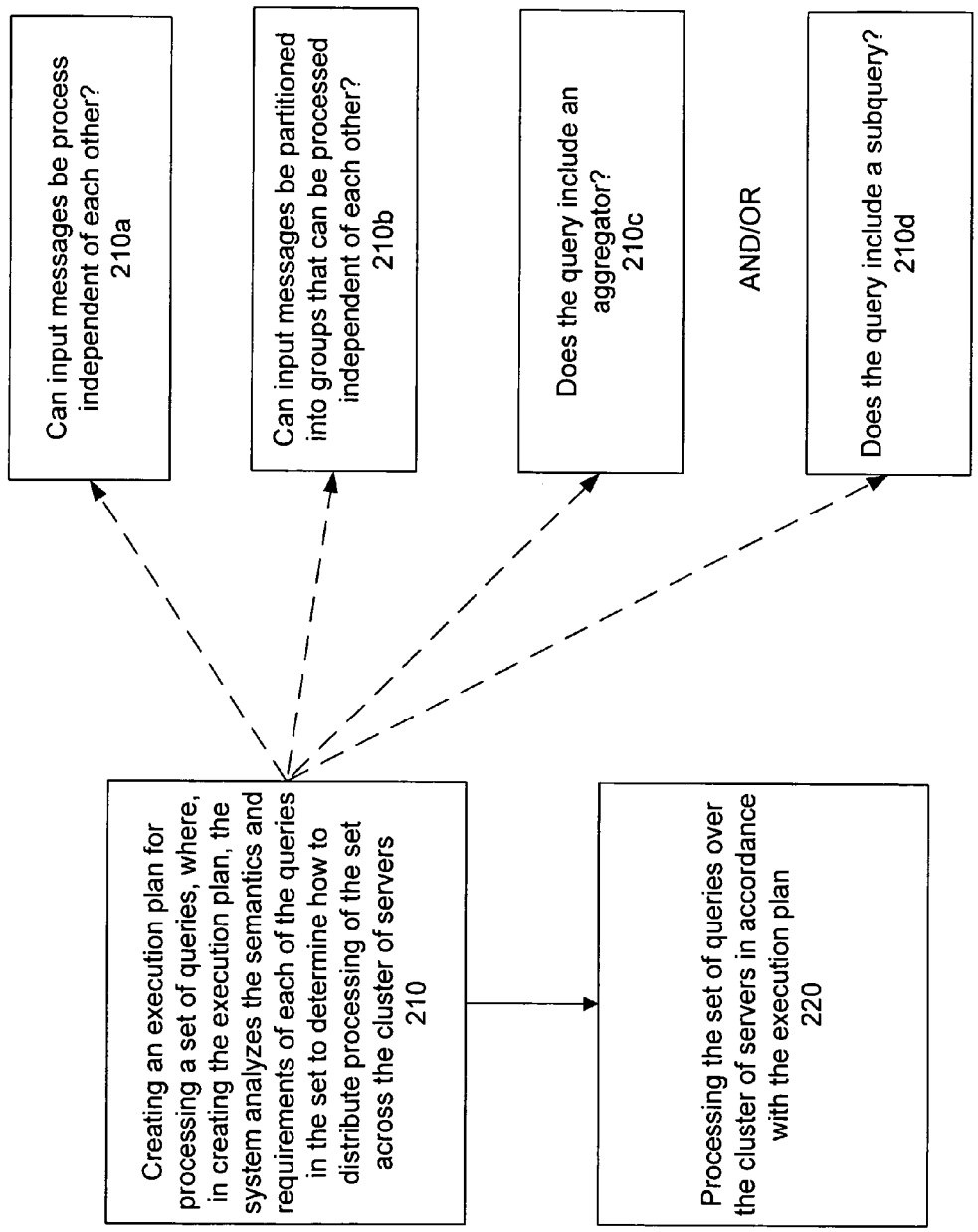
FIG. 2 is a diagram that illustrates a method, in a continuous processing system, for processing a set of registered queries over a cluster of servers.

FIG. 2 illustrates a method, in a continuous processing system, for processing a set of registered queries over a cluster of servers, where each query subscribes to at least one input data stream and publishes to an output data stream. The method comprises creating an execution plan for processing the set of queries over the cluster of servers, where, in creating the execution plan, the system analyzes the semantics and requirements of each of the queries in the set to determine how to distribute processing of the set across the cluster of servers (step 210). In one embodiment, the system also factors in any manual hints or instructions inputted by a system administrator or developer for distributing processing.

The method also comprises processing the set of queries over the cluster of servers in accordance with the execution plan (step 220). Such processing may include generating partial outputs for at least one query in the set and using such partial outputs to generate an output data stream for such query. The term "server", as used herein, means any processing entity. One machine can have one server or multiple servers.

In creating the execution plan, the compiler 120 parses a query, extracts the semantics, and analyzes what is required. Analysis of a query can include determining if, during query processing, input messages can be processed independently of each other (step 210*a*) or partitioned into groups that can be processed independently of each other (step 210*b*). In the latter case, each group consists of input messages that need to be processed together on the same server. Furthermore, analysis of a query can include determining whether the query includes an aggregator function (step 210*c*) or a sub-query (step 210*d*).

If input messages for a query can be processed independent of each other (i.e., processing of one message does not depend on another message), then processing of such query can be distributed over a server cluster by: (1) installing identical logic for processing the query on two or more servers in the cluster and (2) dividing the input messages among such servers, where the input messages can be divided up in any way. In one embodiment, the continuous processing system determines if messages can be processed independent of each other by performing data flow and semantic analysis that indicates whether or not messages need to interact with each other during query processing.

Figure 3:
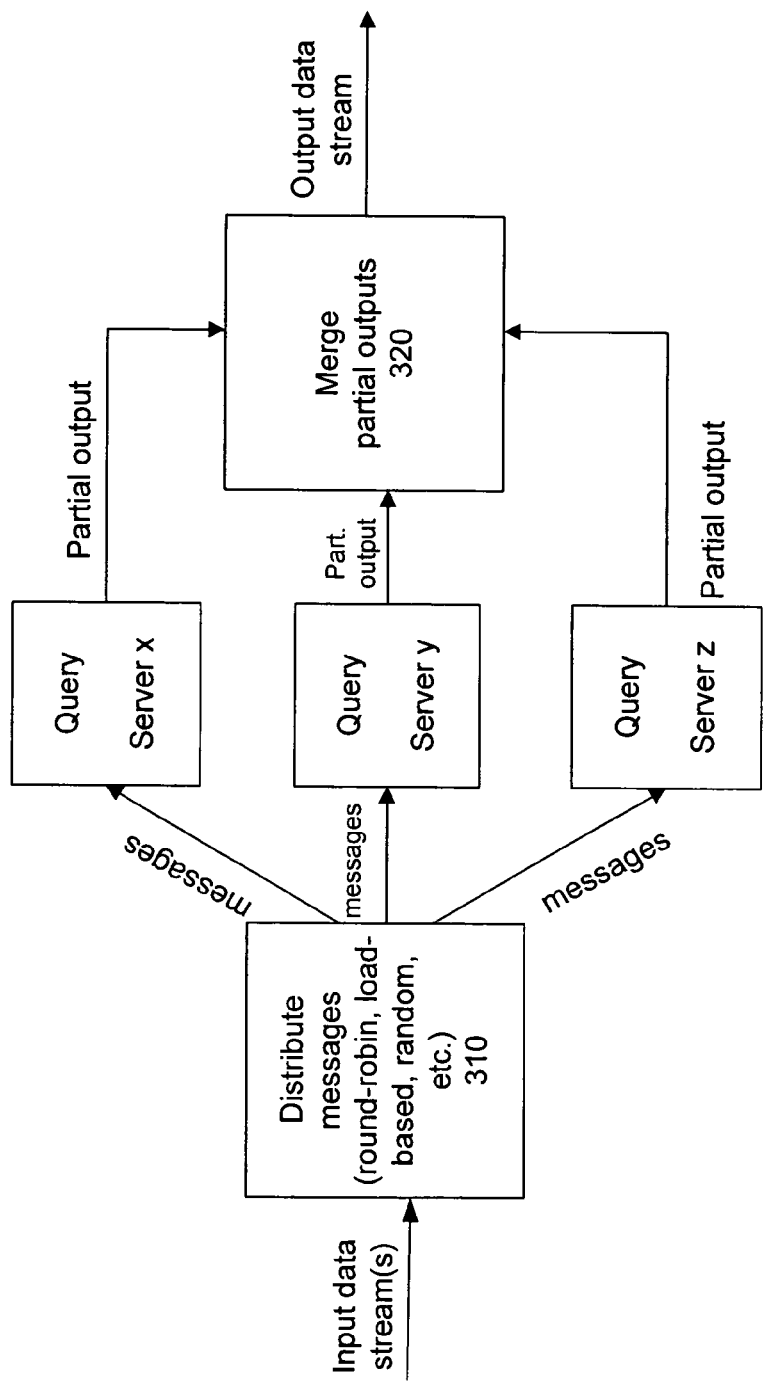
FIG. 3 is a block diagram that illustrates an example of distributed query processing when input messages for a query can be processed independently of each other.

FIG. 3 illustrates an example of distributed query processing when input messages for a query can be processed independent of each other. The query-processing logic is duplicated on servers x, y, and z. Messages from the input message stream are divided up and distributed to servers x, y, and z (310). Since the messages can be processed independent of each other, they can be divided up in any way. For instance, they can be divided up in a round-robin manner, a random manner, and in a manner that balances the load among the servers having the query processing logic.

Each of servers x, y, and z generates a partial output for the query. The output is "partial" because each server only processes a portion of the input messages. The partial outputs are then merged to create the output data stream (320). In some cases, the partial outputs and final output may be generated in the context of time- or row-based windows (windows are described in U.S. patent application Ser. No. 11/346,119, which is referenced above). For example, to generate a partial output, a query may operate on input messages received within a 5 second window, or it may operate on the last 5 rows it received.

An example of a query in which messages can be processed independent of each other is a filter operation, which may be expressed as follows:

Insert into Stream2

Select *

From Stream1

Where cost>10.0

The above query, as well as the other example queries disclosed herein, is written in Coral8's CCL language, which is described in U.S. patent application Ser. No. 11/346,119 (referenced above). In a filter operation, messages do not need to interact with each other. Instead, they can be filtered independently, and those input message satisfying the filter expression can be merged into the output data stream.

If input messages for a query can be partitioned into groups that can be processed independent of each other (where each groups consists of messages that need to be processed together), then processing of the query can be distributed over a server cluster by (1) installing identical logic for processing the query on two or more servers in the cluster and (2) dividing the input message among such servers by such groups, where a single group is processed on the same server (i.e., the group is not divided up among servers).

Figure 4:
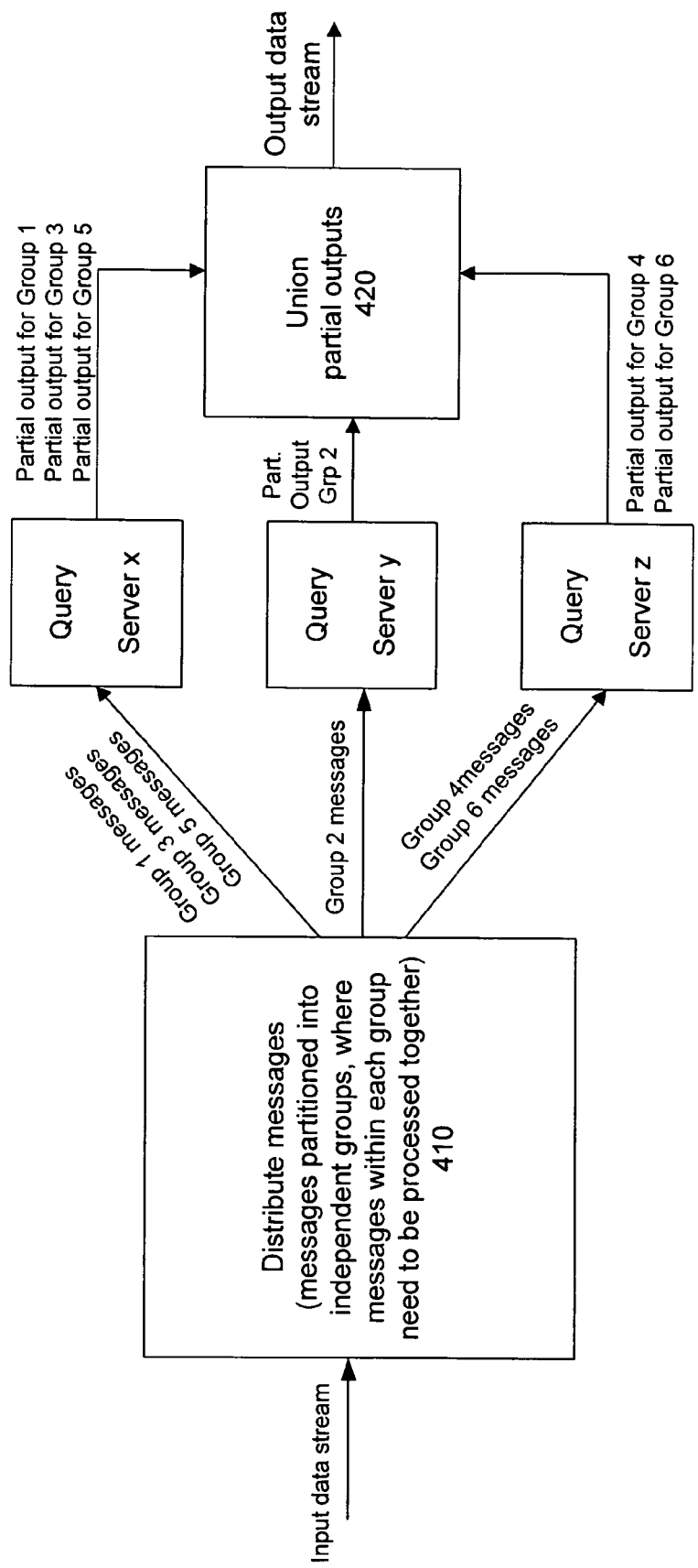
FIG. 4 is a diagram that illustrates an example of distributed query processing when input messages for a query can be partitioned into groups that can be processed independent of each other.

FIG. 4 illustrates an example of distributed query processing when input messages for a query can be partitioned into groups that can be processed independent of each other. In this example, the messages can be partitioned into six groups (Groups 1-6). The query-processing logic is duplicated on servers x, y, and z. Messages from the input message stream are divided up and distributed to servers x, y, and z by groups (410). Server x receives messages in Groups 1, 3 and 5, server y receives messages in Group 2, and server z receives messages in Groups 4 and 6.

Each of servers x, y, and z generates a partial output for the query, where each partial output corresponds to one of the groups. The output data stream is then a union of these partial outputs (420). In some cases, the partial outputs, as well as the final output, may be generated in the context of time-based or row-based windows.

Groups can be based on clauses in the query that define groupings. The "Group By" clause in the below query is an example:

Insert into AvgPrices

Select AVG(Trades.Price)

From Trades KEEP 10 minutes

Group By Trades.Symbol

This query calculates a 10 minute moving average of stock prices. In this query, the input data steam is "Trades," where the query specifies that data in the "price" column of the "Trades" stream should be averaged over a moving 10 minute period and the averages should be outputted to the output data stream "AvgPrices." The "Group By" clause specifies that, in calculating the averages and generating the output data stream, the messages should be grouped by stock symbol. Consequently, all messages for the same symbol should go to the same server as they are processed in the context of each other, but messages for different symbols do not interact with each other and thus can be processed on different servers. In determining how to distribute query processing over a cluster, the continuous processing system may examine the queries for clauses like the "Group By" clauses.

If a query includes an aggregator function (such as MAX, MIN, SUM, etc.), then processing of such query can be distributed over a server cluster by (1) installing the aggregator functionality on two or more servers in the cluster and (2) dividing the input messages among such servers, where the input messages are divided up in any way.

Figure 5:
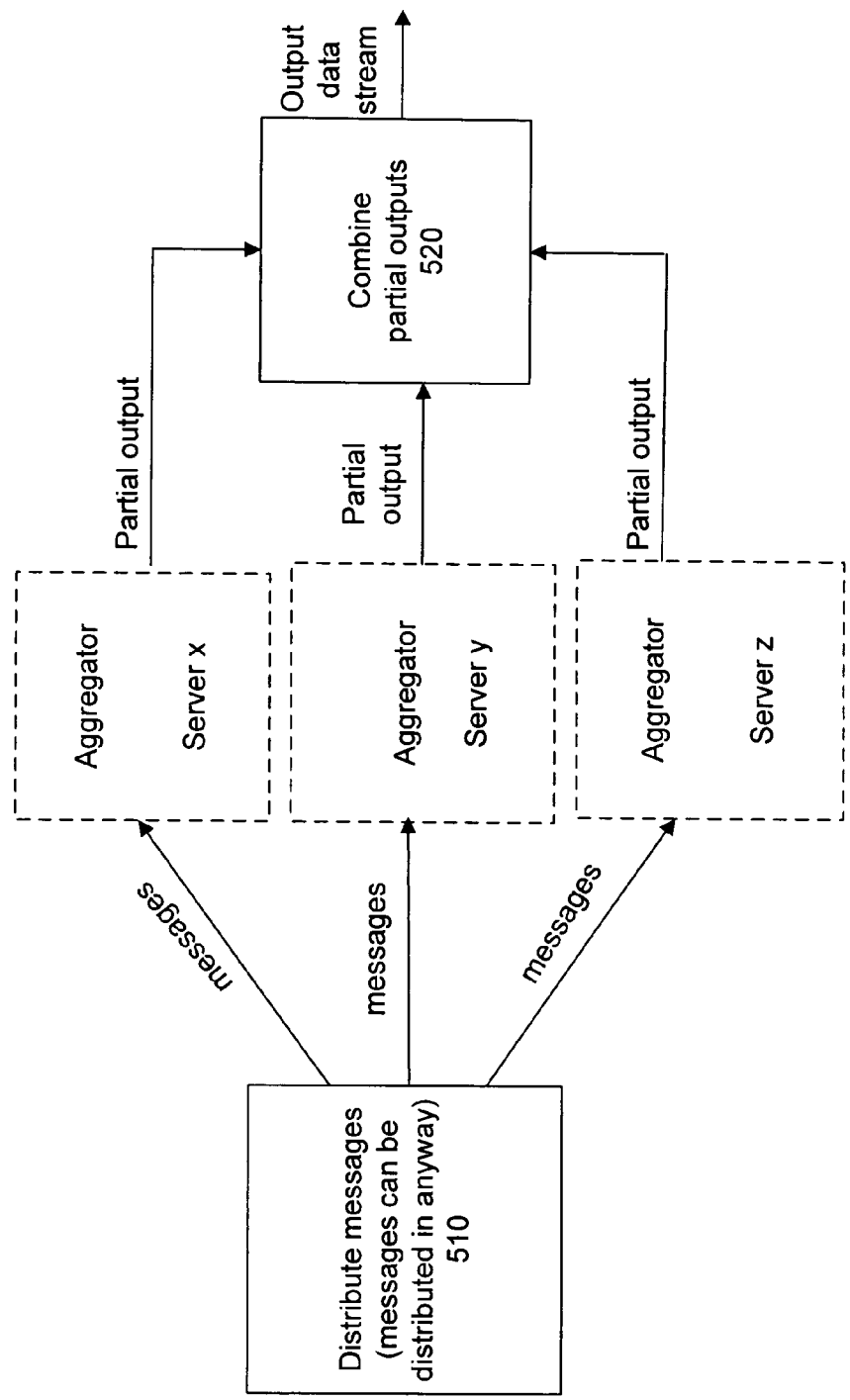
FIG. 5 is a block diagram that illustrates an example of distributed query processing when the query includes an aggregator function.

FIG. 5 illustrates an example of distributed query processing when the query includes an aggregator function. The aggregator logic is duplicated on servers x, y, and z. Messages from the input data stream are divided up and distributed to servers x, y, and z in any manner (round robin, load-based, randomly, etc.) (510).

Each of servers x, y, and z generates a partial output for the query. The output is "partial" because each server only processes a portion of the input messages. The partial outputs are then combined to create the output data stream (520). In some cases, the partial outputs, as well as the final output, may be generated in the context of time-based or row-based windows.

An example of a query that includes an aggregator is as follows:

Insert into MaxPrices

Select Max(Trades.Price)

From Trades KEEP 10 minutes

Figure 6:
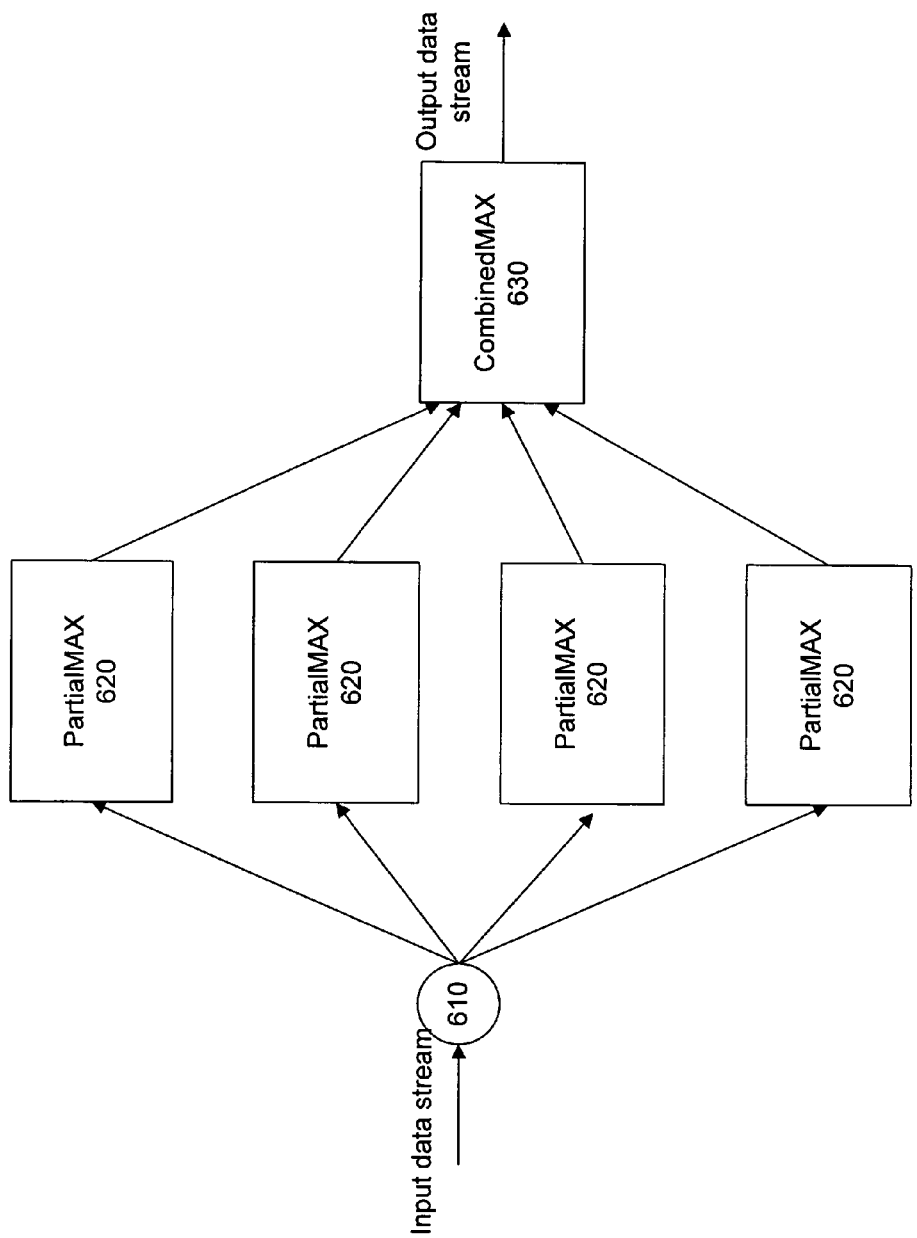
FIG. 6 is a block diagram that illustrated an example of distributed processing of a continuous query that includes the MAX function.

This query calculates a 10 minute moving maximum trade price. The input data stream is "Trades" and the output data stream is "Max Prices." The aggregator function is the "MAX" function, which calculates the maximum value within a data set. As illustrated in FIG. 6, "MAX", as well as most other aggregators, can be computed as followings:

1) Split the input date stream into an arbitrary number of "buckets" by duplicating the "MAX" logic on a number of servers (610). Note: Since the query above specifies "KEEP 10 minutes," all incoming messages should go into the same 10 minute window (i.e., each bucket should correspond to the same 10 minute time period).
2) Compute a "MAX" for each bucket, resulting in partial "MAX" outputs ("PartialMAX") (620)
3) Compute the "MAX" of the partial outputs to generate the output data stream (630).

In this case, this technique allows one to scale both CPU and memory usage of computing "MAX" across a number of servers. The same technique can apply to MIN (i.e., a function that calculates a minimum), COUNT (i.e., a function that calculates a count), AVERAGE (i.e., a function that calculates averages), SUM (i.e., a summation function), STD DEVIATION (i.e., a function that calculates a standard deviation), and many other aggregators (e.g., EVERY, ANY, SOME). Note that in some cases intermediate servers need to send extra information to the merging server. For example, when computing AVERAGE, not only PartialAVERAGEs, but also PartialCOUNTs must be communicated to enable the computation of CombinedAVERAGE.

If a query includes a subquery, then processing of such query can be distributed over a server cluster by: (1) replacing the subquery with a new input data stream, (2) creating a new query based on the subquery that generates the new data stream, and (3) processing the query (with the new data stream) and the new query on separate servers. FIG. 7 illustrates an example of this. Query 710 includes subquery 720. To distribute processing of query 710, the subquery 720 is replaced with new input data stream 730 (i.e., Query 710 subscribes to input data stream 730). A new query 740 performs the same functionality as the subquery 720 and generates, as its output, new data stream 730. Processing is distributed by processing query 710 and new query 740 on different servers.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. In a continuous computation system, an automated method for processing a set of registered queries over a cluster of servers, wherein each query subscribes to at least one input data stream, the method comprising:

creating an execution plan for processing the set of queries over the cluster of servers, where, in creating the execution plan, the system analyzes the semantics and requirements of each of the queries in the set to determine how to distribute processing of the set across the cluster of servers;

installing query logic on the cluster of servers in accordance with the execution plan, wherein such logic is installed prior to receiving input messages and wherein logic for an individual query is distributed over a plurality of the servers in the cluster; and continuously running the set of queries over the cluster of servers in accordance with the execution plan;

receiving, at the continuous computation system, streaming input messages on one or more input data streams, wherein input messages can arrive continuously;

distributing the streaming input messages over the cluster of servers while the set of queries are running; and generating partial outputs for at least one query in the set over two or more servers and using such partial outputs to generate an output data for such query.

2. The method of claim 1, where, in creating the execution plan, analysis of a query includes determining whether input messages for the query can be processed independent of each other.

3. The method of claim 2, where the system determines if input messages can be processed independent of each other by performing data flow and semantic analysis.

4. The method of claim 1, wherein, when input messages for a query can be processed independent of each other, the installing step includes installing identical logic for processing such query on two or more servers in the cluster, and the input messages are divided up among the servers having the logic.

5. The method of claim 4, where the input messages are divided up in a round-robin manner.

6. The method of claim 4, where the input messages are divided up randomly.

7. The method of claim 4, where the input messages are divided up in a manner that balances the load on the servers having the logic.

8. The method of claim 4, wherein processing the query further comprises generating partial outputs for the query on the servers having the logic and merging such partial outputs to generate output data for the query.

9. The method of claim 1, where, in creating the execution plan, analysis of a query includes determining whether input messages for the query can be partitioned into groups that can be processed independent of each other.

10. The method of claim 9, wherein, when input messages for a query can be partitioned into groups that can be processed independent of each other, the installing step includes installing identical logic for processing such query on two or more servers in the cluster, and input messages are distributed among the servers having the logic by such groups.

11. The method of claim 10, wherein each group consists of messages that need to be processed on the same server.

12. The method of claim 10, wherein the groups are based on language in the query that defines groups.

13. The method of claim 12, wherein such language is a GROUP BY clause.

14. The method of claim 10, wherein processing the query further comprises generating partial outputs for the query on the servers having the logic and combining such partial outputs to generate an output data for the query.

15. The method of claim 1, wherein in creating the execution plan, analysis of a query includes determining whether the query includes an aggregator function.

16. The method of claim 15, wherein, when a query includes an aggregator function, the installing step includes installing identical logic for processing the aggregator function on two or more servers in the cluster, and running the query includes generating a partial output for aggregator function on each of such servers and then combining such partial outputs.

17. The method of claim 15, where the aggregator function determines a minimum value from a data set.

18. The method of claim 15, where the aggregator function determines a maximum value from a data set.

19. The method of claim 15, where the aggregator function sums values in a data set.

20. The method of claim 15, where the aggregator function is a count function.

21. The method of claim 15, where the aggregator function is a standard deviation function.

22. The method of claim 1, further comprising, in creating the execution plan, analyzing of a query includes determining if the query includes a subquery.

23. The method of claim 22, wherein if a query includes a subquery, creating the execution plan includes replacing the subquery in the query with a new data stream and creating a new query based on the subquery that generates messages into the new data stream.

24. The method of claim 23, wherein the query with the new data stream and the new query are processed on separate servers in the cluster.

25. In a continuous computation system, a method for distributing processing of a query over a cluster of servers, where the query subscribes to at least one input data stream, the method comprising:
   determining whether input messages for the query can be processed independent of each other by analyzing the semantics of the query; and
   in response to determining that input messages for the query can be processed independent of each other:
      installing identical logic for processing the query on two or more servers in the cluster, wherein such logic is installed prior to receiving input messages;
      continuously running the query logic on such servers;
      receiving, at the continuous computation system, streaming input messages on one or more input data streams, wherein input messages can arrive continuously;
      distributing the input messages among such servers in a round-robin manner;
         wherein the input messages are distributed while the query is running;
      generating partial outputs for the query on such servers; and
      merging the partial outputs to generate output data.

26. The method of claim 25, where, in generating the partial outputs, the query operates on the input messages in accordance with a time-based window.

27. The method of claim 25, where, in generating the partial outputs, the query operates on the input messages in accordance with a row-based window.

28. In a continuous computation system, a method for distributing processing of a query over a cluster of servers, where the query subscribes to at least one input data stream, the method comprising:
   determining whether input messages for the query can be partitioned into groups that can be processed independent of each other by analyzing the semantics of the query; and
   in response to determining that input messages for the query can be partitioned into groups that can be processed independent of each other:
      installing identical logic for processing the query on two of more servers in the cluster, wherein such logic is installed prior to processing input messages;
      continuously running the query logic on such servers;
      receiving, at the continuous computation system, streaming input messages on one or more data streams, wherein input messages can arrive continuously;
      distributing the input messages among such servers by such groups, wherein messages are distributed while the query is running;
      generating partial outputs for the query on such servers; and
      combining such partial outputs to generate output data for the query.

29. The method of claim 28, wherein each of the groups consists of messages that need to be processed together.

30. The method of claim 28, wherein the groups are based on language in the query that defines groups.

31. The method of claim 28, wherein such language is a GROUP BY clause.

32. The method of claim 28, where, in generating the partial outputs, the query operates on the input messages in accordance with a time-based window.

33. The method of claim 28, where, in generating the partial outputs, the query operates on the input messages in accordance with a row-based window.

34. In a continuous computation system, a method for distributing processing of a query over a cluster of servers, where the query subscribes to at least one input data stream, the method comprising:
   determining whether the query includes an aggregator function by analyzing the semantics of the query; and
   in response to determining that the query includes an aggregator function:
      installing identical logic for processing the query on two of more servers in the cluster, wherein such logic is installed prior to processing input messages;
      continuously running the query logic on such servers;
      receiving, at the continuous computation system, streaming input messages on one or more input data streams, wherein input messages can arrive continuously;
      distributing the input messages among such servers, wherein input messages are distributed while the query is running;
      and
      generating partial outputs for the aggregator function on such servers; and
      combining such partial outputs.

35. The method of claim 34, where the aggregator function determines a minimum value from a data set.

36. The method of claim 34, where the aggregator function determines a maximum value from a data set.

37. The method of claim 34, where the aggregator function sums values in a data set.

38. The method of claim 34, where the aggregator function is a count function.

39. The method of claim 34, where the aggregator function is a standard deviation function.

40. The method of claim 34, where, in generating the partial outputs, the aggregator function operates on the input messages in accordance with a time-based window.

41. The method of claim 34, where, in generating the partial outputs, the aggregator function operates on the input messages in accordance with a row-based window.

42. In a continuous computation system, a method for distributing processing of a first query over a cluster of servers, where the first query subscribes to at least one input data stream, the method comprising:

determining whether the first query includes a subquery by analyzing the semantics of the query; and in response to determining that the first query includes a subquery:

replacing the subquery in the first query with a new input data stream;

creating a second query based on the subquery, where the second query generates messages into the new input data stream, wherein logic for the second query is installed on a separate server than logic for the first query and such installation is performed prior to processing input messages;

continuously running the first and second queries on separate servers;

receiving streaming input messages needed for the second query at the continuous computation system, wherein such input messages can arrive continuously; and sending such input messages to the server with the second query, while the first and second queries are running.

\* \* \* \* \*